United States Patent [19]

Hartel et al.

[11] Patent Number: 5,329,822
[45] Date of Patent: Jul. 19, 1994

[54] YARN TENSION SENSOR FOR A TEXTILE MACHINE

[75] Inventors: Robert Hartel, Aachen; Karl-Josef Hoehne, Cologne; Ferdinand-Josef Hermanns, Erkelenz; Herbert Henze, Moenchengladbach; Herbert Knors, Moenchengladbach; Dietmar Engelhardt, Moenchengladbach; Wilhelm Zitzen, Moenchengladbach; Manfred Veyes, Moenchengladbach; Herbert Merkens, Erkelenz; Wolfram Weissenfels, Moenchanglabach; Hermann Ruetten, Viersen; Dirk Jaegers, Moenchengladbach; Berndt Pommer, Moenchanglabach, all of Fed. Rep. of Germany

[73] Assignee: W. Schlafhorst AG & Co., Moenchengladbach, Fed. Rep. of Germany

[21] Appl. No.: 940,671

[22] Filed: Sep. 4, 1992

[30] Foreign Application Priority Data

Sep. 7, 1991 [DE] Fed. Rep. of Germany ....... 4129803

[51] Int. Cl.$^5$ ................................. G01L 1/00
[52] U.S. Cl. ......................... 73/862.61; 73/862.391
[58] Field of Search ............... 73/862.46, 862.451, 73/862.61, 862.391

[56] References Cited

U.S. PATENT DOCUMENTS 2,767,576 10/1956 Seney ................. 73/862.61
3,403,553 10/1968 Wiener ............... 73/862.451

FOREIGN PATENT DOCUMENTS

| 0158199 | 10/1985 | European Pat. Off. |
|---|---|---|
| 0195938 | 2/1986 | European Pat. Off. ........ 73/862.391 |
| 0577161 | 10/1976 | Fed. Rep. of Germany . |
| 3429864 | 5/1985 | Fed. Rep. of Germany . |
| 3506698 | 8/1986 | Fed. Rep. of Germany . |
| 3718924 | 12/1987 | Fed. Rep. of Germany . |
| 8717830 | 7/1990 | Fed. Rep. of Germany . |
| 4039121 | 6/1991 | Fed. Rep. of Germany . |
| 4027275 | 3/1992 | Fed. Rep. of Germany . |
| 439791 | 12/1967 | Switzerland . |
| 949361 | 8/1982 | U.S.S.R. . |

Primary Examiner—Richard E. Chilcot, Jr.
Assistant Examiner—R. Biegel
Attorney, Agent, or Firm—Shefte, Pinckney & Sawyer

[57] ABSTRACT

The invention to a yarn tension sensor, in particular for yarns traveling at high speed, to accurately ascertain even short-term yarn tension fluctuations. According to the invention, a yarn guide element is mounted on one head end of a plunger coil disposed in a magnetic field. A position sensor is disposed in the region of the plunger coil and detects even minimal changes in position of the plunger coil. These changes in position are reported to a controller, at whose output variations in current are generated and supplied to the winding of the plunger coil, the variations being such to compensate for the axial force generated by the yarn and acting upon the plunger coil, thereby making the plunger coil virtually motionless.

14 Claims, 3 Drawing Sheets

YARN TENSION SENSOR FOR A TEXTILE MACHINE

FIELD OF THE INVENTION

The present invention relates to a yarn tension sensor for a textile machine.

BACKGROUND OF THE INVENTION

Yarn tension sensors on textile machines have been known for a long time and serve to ascertain yarn breaks, or directly to control the yarn tension by means of a yarn tensioning device, with the goal being to make this tension uniform.

Such devices are known, for instance from DE-OS 20 60 733 or SU-UHF 12 17 764. In these known devices, the deflection of a yarn guide, which is dependent on the yarn tension, is transmitted mechanically and converted into control signals to vary the mutual pressing force of tension device plates of a yarn tensioning device. These devices have a relatively high control inertia, which is due to the length of the motion of the yarn guide connected to the yarn tension meter. At high yarn speeds, such devices begin to vibrate, which greatly limits the accuracy of measurement.

The earlier German Patent Application P 40 30 892.8 (which however does not have a publication date prior to the priority date of the present invention) discloses a yarn tension measuring instrument the basic principle of which is based on the measurement of the temperature generated by the sliding friction of the yarn against a yarn guide. This yarn guide, having a temperature sensor, can be disposed in stationary fashion, so that no vibration occurs even at high yarn speeds.

The known yarn tension sensors are not capable of detecting high-frequency yarn tension fluctuations.

SUMMARY OF THE INVENTION

It is therefore an object of the present invention to propose a yarn tension sensor for a textile machine, which is suitable for measurement of yarn tension on yarns traveling at high speed, and with which even high-frequency yarn tension fluctuations can be detected.

Briefly summarized, the yarn tension sensor of the present invention accomplishes the foregoing objective by providing, in combination, a suitable means for generating a magnetic field, a plunger having a coil winding and disposed for axial movement within the magnetic field, a yarn guide element mounted to one end of the plunger, a position sensor disposed in sufficiently close proximity to the plunger to detect changes in the position thereof representative of tension fluctuations in a yarn traveling in contact with the yarn guide element, and a controller connected to the position sensor to receiver plunger position signals therefrom and also connected to the coil winding of the plunger to regulate electrical current through the coil winding as a function of the plunger position signals to produce an axial force on the plunger sufficient to compensate for the tension fluctuations. The yarn tension sensor also includes a suitable means for determining the electrical current through the coil winding as a measure of the prevailing yarn tension.

The yarn tension sensor according to the present invention measures virtually motionlessly, and has high dynamic properties. Since the device of the invention is current/force-proportional to a great extent, the plunger coil current can be drawn as a direct variable of yarn tension, given suitable design of the controller. Hence detecting the yarn tension is not dependent on the extent of deflection of a yarn guide. The control inertia can easily be reduced, to values of from 30 to 50 Hz or even more, for example, depending on the dimensioning and selection of the components. The layout is relatively simple and not very vulnerable to malfunction.

In the preferred embodiment of the present invention, the current determining means is preferably connected to a device for evaluating the course of the yarn tension over time. For example, the evaluation device may include means for detecting periodic and nonperiodic yarn tension fluctuations and for comparing the fluctuations with a predetermined yarn tension characteristic. Thus, the evaluation device may be coupled to a yarn transport component of the textile machine, e.g., a yarn braking device, to influence the component in relation to deviations from the predetermined yarn tension characteristic. Also, the evaluation device may be coupled with a signal device which outputs a malfunction signal in the event of periodic yarn tension fluctuations that do not match the predetermined yarn tension characteristic, e.g., a circuit may be provided to shut down the yarn transport component and generate the malfunction signal if periodic fluctuations which normally arise during yarn travel are absent. The yarn transport component may be driven, in which case the evaluation device may be equipped with a circuit to lower the driven yarn speed in the event of an increase in the yarn tension beyond a predetermined extent.

The magnetic field generating means may comprise pole pieces which define an air gap in which the plunger is longitudinally displaceably disposed, with the pole pieces being arranged to extend over only a portion of the plunger. Diaphragms may be provided for suspending the plunger in the air gap. Alternatively, the plunger may be secured to at least one carrier which extends in the axial direction of the plunger and is supported in a longitudinally displaceable manner. Further, the plunger may be secured to a lever which is rotatably supported on a shaft disposed perpendicularly to the axis of the plunger.

The position sensor may be an analog Hall chip or, alternatively, may comprise a light gate having a light source and a photosensor.

Because relatively high-frequency yarn tension fluctuations are detectable, it is also possible to distinguish between periodic and nonperiodic fluctuations and among fluctuations of variable periodicity. A considerably wider range of applications for the yarn tension sensor is thus attainable.

Besides compensating for nonperiodic yarn tension fluctuations via yarn braking means, such as yarn tensioning devices, the opportunity exists of producing a malfunction signal in the event of periodic deviations from the specified yarn tension characteristic. For example, the absence of the periodic yarn tension fluctuation caused by the traversing of the yarn when a reversing thread traversing roller or drum for placing the yarn, may be detected as a yarn wrapping about the roller or drum, upon which the immediate shutdown of the winding station is initiated.

However, with the aid of the yarn tension sensor of the invention, it is also possible to detect the progressive increase in yarn tension as the last third of a cop is wound up at the winding station and to throttle the winding speed accordingly to avoid yarn breaks.

The length of the plunger coil beyond the width of the pole pieces itself assures a linear current/force behavior in the event that the plunger coil executes slight longitudinal motions, since the magnetic lines beginning at the pole pieces always fully intersect the plunger coil.

The suspension of the plunger coil may be done in various ways; care must merely be taken that the retainer itself does not affect the free mobility of the plunger coil. With an analog Hall chip or a light gate, even slight changes in position of the plunger coil can be ascertained.

DESCRIPTION OF THE PREFERRED EMBODIMENTS

Figure 1:
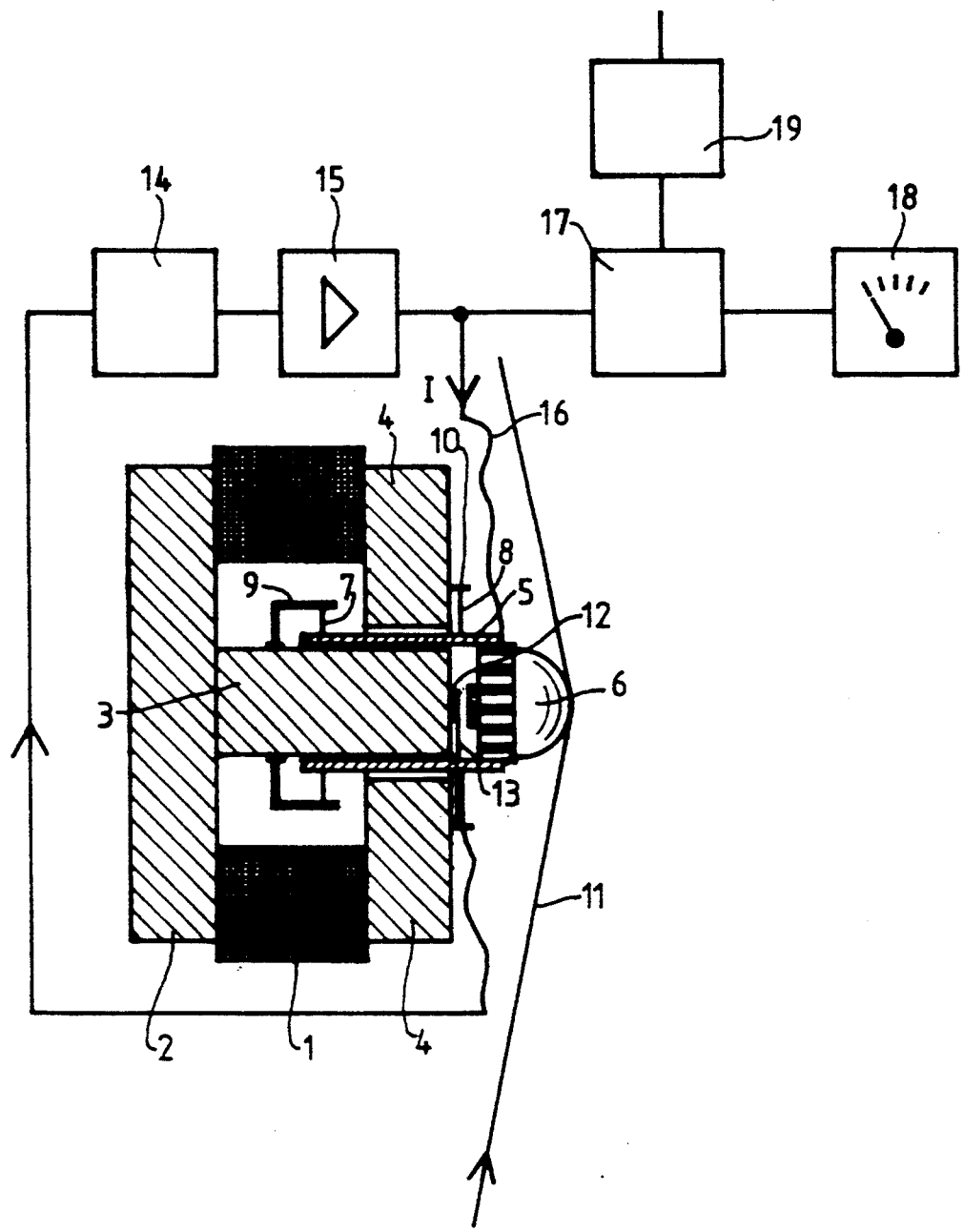
FIG. 1 is a schematic view of a yarn tension sensor with an associated circuit.

The yarn tension sensor shown in FIG. 1 has a ring magnet 1, on which a pole disk 2 is mounted to one axial side and a pole ring 4 is mounted on the other axial side. A plunger coil 5 protrudes axially into the center opening of the pole ring 4, forming an annular air gap therebetween. From the opposite direction, a core 3 secured centrally to the pole disk 2 protrudes into this plunger coil 5. The plunger coil 5 forms an annular air gap with this core 3 as well.

Figure 2:
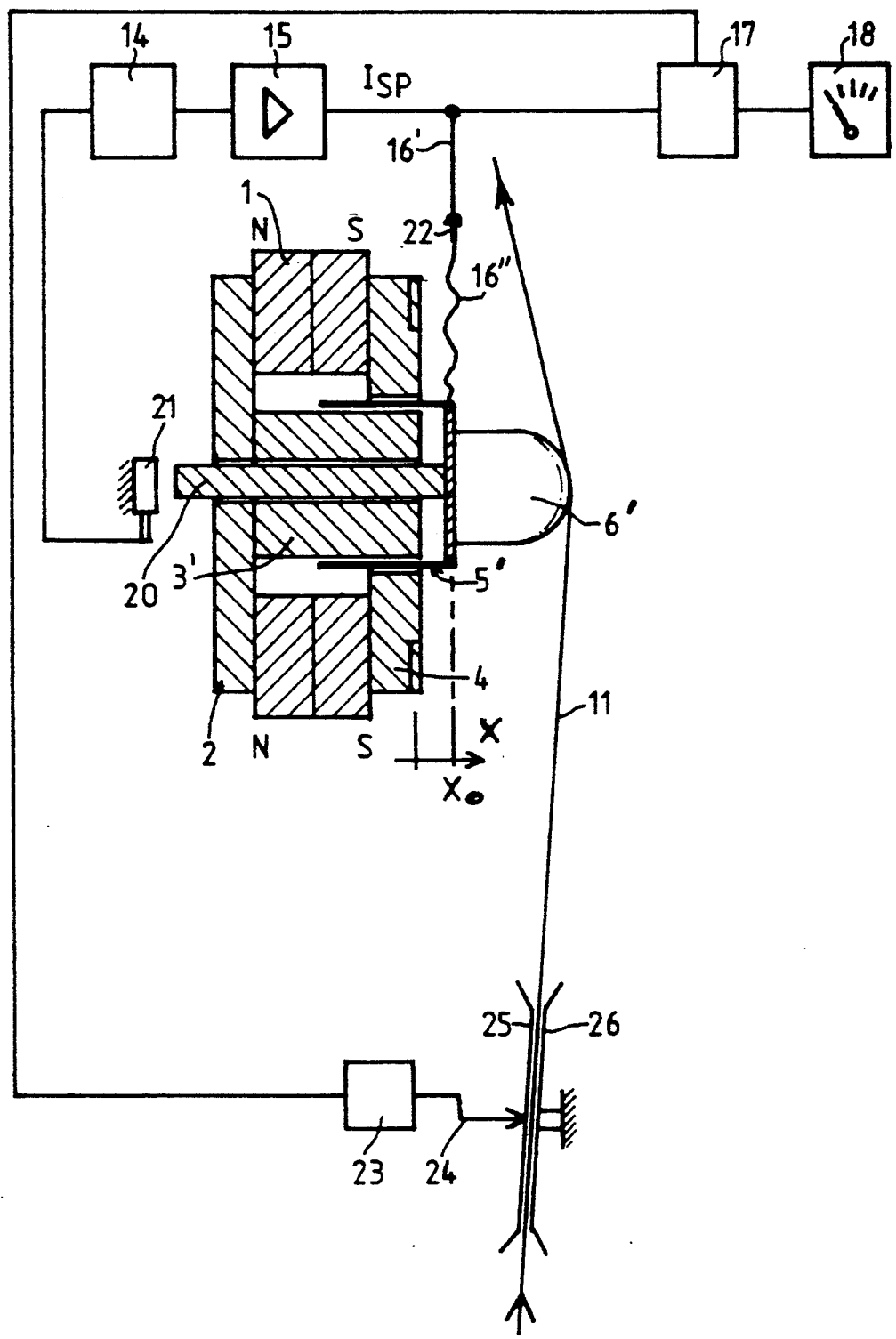
FIG. 2 shows a variant of the yarn tension sensor of FIG. 1, with a yarn tensioning device controlled as a function of the yarn tension.

The pole disk 2, core 3 and pole ring 4 are of ferromagnetic material. As a result, the lines of magnetic force are concentrated toward these components. Without this being shown in detail here, these lines begin at the ring magnet 1 and extend through the pole disk 2, the core 3 via the air gap in which the plunger coil 5 is disposed, and the pole ring 4 to the opposite side of the ring magnet 1. The ring magnet is polarized axially (as shown in FIG. 2).

The magnetic flux concentrated by the ferromagnetic components is interrupted only by an air gap of small size, and the intensity of the magnetic field in the air gap is therefore correspondingly high. An adequate force can therefore also be exerted upon the plunger coil 5 when current flows through it.

The plunger coil 5 of FIG. 1 is retained by two diaphragms 7 and 8 in such a manner that it can execute only an axial motion. The diaphragms 7 and 8 have retainers 9 and 10, which are secured to the core 3 and the pole ring 4, respectively. A yarn guide 6, by way of which a traveling yarn 11 is pulled, is mounted on the outward head end of the plunger coil 5.

The position of the plunger coil 5 is monitored by means of an analog Hall chip 12. Even minimal changes in position are detected by this Hall chip 12 and are transmitted over a line 13 to a controller 14. At its output, this controller 14 varies the current intensity I, which is amplified by an amplifier 15 and then supplied over a line 16 to the winding of the plunger coil 5. This instantaneously changes, or in other words adapts, the coil current and hence the axial force of the plunger coil 5 that counteracts the axial force generated by the yarn 11 at the yarn guide 6. By the use of this position regulating circuit, the minimal changes in position resulting from fluctuations in yarn tension are immediately smoothed out to zero.

Since this electrodynamic linear drive has a linear force/current behavior, the plunger coil current is directly proportional to the prevailing tension in the yarn 11. The current I delivered to the plunger coil via the line 16 is simultaneously detected by an evaluation device 17. This evaluation device 17 determines the instantaneous yarn tension and delivers it to a display device 18. The display device 18 makes it additionally possible to visually monitor fluctuations in yarn tension, especially long-term fluctuations. The evaluation device 17 is embodied such that it can evaluate the course of yarn tension over time. It separates the yarn tension fluctuations into periodic and nonperiodic fluctuations. Detection of the periodic fluctuations can then be done by known processes, such as Fourier analysis, autocorrelation, or the use of a selective filter.

A comparison of the periodic and nonperiodic yarn tension fluctuations is done in the evaluation device 17 with a specified yarn tension characteristic. This characteristic includes periodic yarn tension fluctuations in a winding machine that arise from yarn placement when a cross-wound bobbin is made, for instance. When a cop is unwound, especially in the last third of the cop, the yarn tension also increases progressively.

If the periodic fluctuation in yarn tension caused by yarn placement continues to be absent, for instance, then in a winding machine that carries out the yarn placement with a reversing thread traversing roller, it is possible to conclude that the yarn has become wrapped about the roller. In that case, a malfunction signal simultaneously is output via a signal device 19, and the winding process is stopped. This can be done with a clamping and cutting device that is typically present in modern winding machines to cut the yarn and trip the so-called yarn break circuit. When the malfunction signal is issued, the automatic yarn break eliminator is also blocked, and an operator is informed that a manual intervention is necessary.

Upon an increase in the yarn tension, which when compared with the typical course of yarn tension upon unwinding of a cop is determined by the evaluation unit 17 as an increase that is typical for the last third of the cop, the evaluation unit 17 can influence the drive so as to lower the yarn speed to a predetermined amount.

In the variant of the yarn tension sensor shown in FIG. 2, the plunger coil 5' so along with the yarn guide 6', is retained not via diaphragms but rather via a slide bar 20 which is secured to the head end of the plunger coil 5', on the rear end of the yarn guide 6' and is inserted into a longitudinal bore that extends centrally through the core 3' and the pole disk 2'. Provision must be made to assure that the sliding friction is sufficiently low that it does not falsify the outcome of the yarn tension measurement.

A Hall sensor 21, which has the same function as the Hall sensor 12 described in conjunction with FIG. 1, is disposed on the end of the slide bar 20 opposite the yarn guide 6'. The position regulating circuit has basically the same layout as described above, the only difference being that here the line 16 is shown in the form of a solid line segment 16' and a flexible line segment 16" which are joined together via a plug connection 22.

FIG. 2 also shows the zero position $X_o$ of the plunger coil 5', to which possible changes in position along the X axis, caused by fluctuations in yarn tension, can be smoothed out.

Another difference in the embodiment of FIG. 2 is that the evaluation unit 17 is connected to a converter 23, which exerts a compressive force 24 upon one brake disk 25 of a so-called yarn tensioning device. A second brake disk 26, as a counterpart pressure element, is held firmly in a fixed position. By means of this circuit, fluctuations in yarn tension that are detected by the evaluation unit 17 as nonperiodic fluctuations in yarn tension, are balanced out, because a decrease in the yarn tension immediately causes the compressive force 24 to be raised. Optionally, it is also possible during the unwinding of a cop on the winding machine for the rising yarn tension to be balanced out first by lowering of the compressive force 24, while toward the end of the cop, the winding speed is lowered as well.

Figure 3:
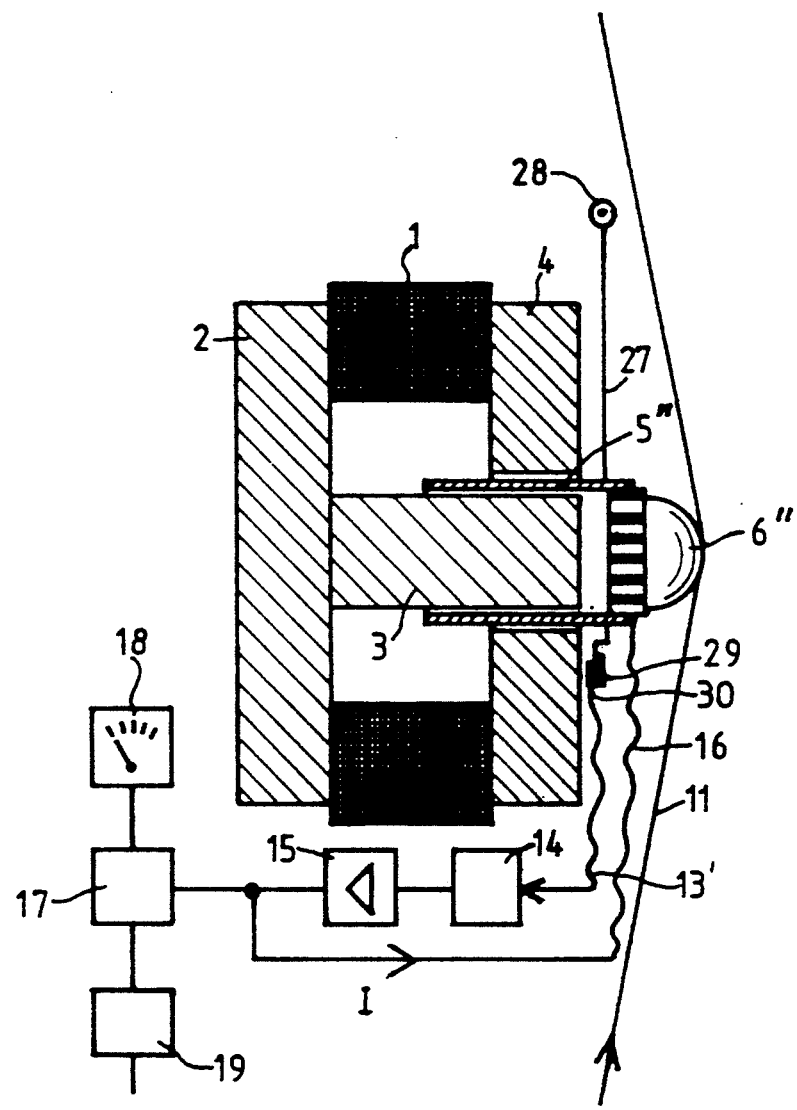
FIG. 3 shows a further variant of the yarn tension sensor.

FIG. 3 shows a further variant of the present yarn tension sensor, and unlike the embodiments described thus far, here the plunger coil 5″ and yarn guide 6″ are mounted on a lever 27. The rotary bearing of the lever 27 may be a known air bearing, for instance, which has a negligibly low rotary resistance. Since the deviations of the plunger coil from the zero position are extremely slight, as already noted, the bearing shown in FIG. 3 again has no disadvantageous effect in terms of changing the air gap, as a function of the lever length that forms the pivotal radius. The length of the lever 27 may also be selected such that the radius of curvature is large enough that normal pivotal movements of the lever 27 do not appreciably change the air gap.

The lever 27 is extended beyond the plunger coil. At the end of this extension, the lever 27 has a chip 29, which covers a photosensor 30 in the zero position of the plunger coil 5″. A light source, with which the photosensor 30 forms a light gate, is not shown here, for the sake of clarity.

If the chip 29 leaves the zero position of the plunger coil 5″, then it no longer fully covers the photosensor 30, and this result is transmitted to the controller 14 via a line 13′. The photosensor is embodied such that it outputs different signals depending on the side from which the light gate is opened.

It can be seen in all three drawing FIGURES that the pole pieces formed by the pole ring 4 and between which pieces the air gap in which the respective plunger coils 5, 5′ and 5″ are disposed is embodied, extends over only a portion of the respective plunger coil. As a result, even upon a change in position of the plunger coil, the linear force/current performance of the system does not change. The position of the plunger coil carrying the yarn guide, which is virtually motionless during yarn travel, enables a virtually inertia-free monitoring of the yarn tension. As a result, at high yarn speeds, a measurement of relatively high-frequency yarn tension fluctuations, for example of up to 50 Hz, is also possible. Not only relatively long periodic or nonperiodic fluctuations in yarn tension, but also relatively high-frequency fluctuations therein effected by yarn placement, for example, can also be detected. This greatly widens the range in which the yarn tension sensor of the invention can be employed. Because of its simple construction, it also has little vulnerability to malfunction.

The plunger coil can be loaded in both directions. As a result, no restoring spring is needed, either.

Because of the quasi-motionlessness of the yarn guide of the yarn tension sensor, it is possible to install it in an electronic yarn cleaner or slub catcher, which recognizes fluctuations in the thickness of the yarn traveling through it. For accurate measurement, such yarn cleaners require calm yarn travel, which would be unimpeded by the present yarn tension sensor.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A yarn tension sensor for a textile machine, particularly adapted for measuring the tensioning of a yarn traveling at high speed, comprising:
   means for generating a magnetic field,
   plunger means having a coil winding and disposed for axial movement within said magnetic field, said plunger means having a surface in direct contact with the yarn for axial movement of the plunger in response to yarn tension fluctuations,
   a position sensor disposed in sufficiently close proximity to said plunger to detect changes in the position thereof representative of tension fluctuations in a yarn traveling in contact with said yarn contact surface, and
   a controller connected to said position sensor to receive plunger position signals therefrom and connected to said coil winding of said plunger for regulating electrical current through said coil winding as a function of said plunger position signals from said position sensor to produce an axial force of said plunger sufficient to compensate for said tension fluctuations.

2. The yarn tension sensor of claim 1, wherein said controller is connected to a device for evaluating the course of the yarn tension over time.

3. The yarn tension sensor of claim 2, wherein said evaluation device includes means for detecting periodic and nonperiodic yarn tension fluctuations and for comparing said fluctuations with a predeterminable yarn tension characteristic.

4. The yarn tension sensor of claim 3, wherein said evaluation device is coupled to a yarn transport component of the textile machine to influence said component in relation to deviations from the predetermined yarn tension characteristic.

5. The yarn tension sensor of claim 4, wherein said evaluation device is coupled with a yarn braking means to compensate for nonperiodic fluctuations in yarn tension.

6. The yarn tension sensor of claim 3, wherein said evaluation device is coupled with a signal device which outputs a malfunction signal in the event of periodic yarn tension fluctuations that do not match the predetermined yarn tension characteristic.

7. The yarn tension sensor of claim 6 and further comprising a circuit which shuts down the yarn transport component and generates a malfunction signal in the signal device if periodic fluctuations which arise during normal yarn travel are absent.

8. The yarn tension sensor of claim 4, wherein said yarn transport component is driven and said evaluation device has a circuit which influences the drive for the yarn transport component in order to lower the yarn speed upon an increase in the yarn tension beyond a predetermined extent.

9. The yarn tension sensor of claim 1, wherein said magnetic field generating means comprise pole pieces defining an air gap in which said plunger is longitudinally displaceably disposed, said pole pieces being arranged to extend only over a portion of the plunger.

10. The yarn tension sensor of claim 1 and further comprising diaphragms for suspending said plunger.

11. The yarn tension sensor of claim 1 and further comprising at least one carrier to which said plunger is secured, said carrier extending in the axial direction of said plunger and being supported in a longitudinally displaceable manner.

12. The yarn tension sensor of claim 1 and further comprising a lever to which said plunger is secured, said lever being rotatably supported on a shaft which is disposed perpendicular to the axis of the plunger.

13. The yarn tension sensor of claim 1, wherein the position sensor comprises an analog Hall chip.

14. The yarn tension sensor of claim 1, wherein the position sensor comprises a light gate having a light source and a photosensor.

* * * * *